US010955852B2

(12) United States Patent
Franzius et al.

(10) Patent No.: US 10,955,852 B2
(45) Date of Patent: Mar. 23, 2021

(54) NAVIGATION SYSTEM BASED ON SLOW FEATURE GRADIENTS

(71) Applicant: HONDA RESEARCH INSTITUTE EUROPE GMBH, Offenbach/Main (DE)

(72) Inventors: Mathias Franzius, Offenbach (DE); Benjamin Metka, Frankfurt am Main (DE); Ute Bauer-Wersing, Frankfurt am Main (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 324 days.

(21) Appl. No.: 15/905,962

(22) Filed: Feb. 27, 2018

(65) Prior Publication Data

US 2018/0246516 A1 Aug. 30, 2018

(30) Foreign Application Priority Data

Feb. 28, 2017 (EP) ..................................... 17158504

(51) Int. Cl.
*G05D 1/02* (2020.01)
*G01C 21/20* (2006.01)
(52) U.S. Cl.
CPC ........... *G05D 1/0221* (2013.01); *G01C 21/20* (2013.01)
(58) Field of Classification Search
CPC .................................................. G05D 1/0221
See application file for complete search history.

(56) References Cited

U.S. PATENT DOCUMENTS 9,436,908 B2 * 9/2016 Piekniewski ............ G06N 3/08
9,460,385 B2 * 10/2016 Piekniewski ............ G06N 3/08
9,626,566 B2 * 4/2017 Versace .................... G06T 7/11
10,503,976 B2 * 12/2019 Versace ................ G06K 9/3241
(Continued)

OTHER PUBLICATIONS

Roland Geraerts et al., "A Comparative Study of Probabilistic Roadmap Planners", Institute of Information and Computing Sciences, Utrecht University, 2002, pp. 1-13.
(Continued)

*Primary Examiner* — Michael A Berns
(74) *Attorney, Agent, or Firm* — Squire Patton Boggs (US) LLP

(57) ABSTRACT

A method and system for navigating a mobile system and corresponding mobile system is disclosed, in particular for autonomous mobile systems such as robots, for example lawn mowers or even smartphones. The mobile device includes at least one sensor, an electronic control unit, and an output unit. The method includes acquiring sensor data on an environment of the mobile device, calculating a gradient of a difference of a target environmental representation and a current environmental representation, and determining a movement direction to reach a target position corresponding to the target environmental representation based on the estimated gradient. The determined movement direction for navigating the mobile device is output, for example to a steering system of the mobile device or to a display. The method can include generating an environmental representation by performing unsupervised learning from the acquired sensor data.

20 Claims, 3 Drawing Sheets

(56) References Cited

U.S. PATENT DOCUMENTS

| | | | |
|---|---|---|---|
| 10,572,776 B2* | 2/2020 | Viola | G06K 9/00624 |
| 2014/0244557 A1* | 8/2014 | Piekniewski | G06N 3/02 |
| | | | 706/16 |
| 2015/0269439 A1* | 9/2015 | Versace | G06N 3/049 |
| | | | 382/103 |
| 2017/0213148 A1* | 7/2017 | Mytkowicz | G06F 30/00 |
| 2019/0266449 A1* | 8/2019 | Viola | G06K 9/6262 |

OTHER PUBLICATIONS

Benjamin Metka et al., "Outdoor Self-Localization of a Mobile Robot Using Slow Feature Analysis", University of Applied Sciences Frankfurt, Germany, Honda Research Institute Europe GmbH, 2013, pp. 1-8.

Laurenz Wiskott et al., "Slow Feature Analysis: Unsupervised Learning of Invariances" Neural Computation 14, 2002, pp. 715-770.

* cited by examiner

NAVIGATION SYSTEM BASED ON SLOW FEATURE GRADIENTS

BACKGROUND

Field

The invention relates to the field of navigation for mobile systems and in particular for autonomous mobile systems such as robots. The invention proposes a method for navigating a mobile system and a corresponding navigation system.

Description of the Related Art

Navigation is a crucial capability for many mobile systems. For navigation, a mobile system generally needs an internal representation of the environment to estimate its own current location and to plan a viable path to a target location. Navigation strategies have different levels of complexity ranging from reactive motion execution to path planning in metrical maps of the environment.

Navigation provides a solution to the problem of a mobile system, for example an autonomously operating vehicle, having to move from a start location, for example the autonomously operating vehicle's current location, to a target location. There may exist no direct path between the start location (current location) and the target location (destination), so that the autonomously operating vehicle has to find a path that circumnavigates obstacles, preferably a path which also has a minimum travel time from the start location to the target location. At a same time, available processing and memory resources of the autonomously operating vehicle are often limited.

Known solutions to this problem involve steps of building a metric or topological map of the environment including the start location and the target location. This map may be built offline and acquired by the autonomously operating vehicle. In case of a simultaneous localization and mapping (SLAM) approach, the map may be generated online by a navigation system of the autonomously operating vehicle. Then, the target location is to be selected as well as the own current location (start location). In a subsequent step a trajectory (path) T in the map is searched which does not cross obstacles and often also provides a shortest path between the current location and the target location, for example by performing an optimization algorithm. The autonomously operating vehicle then follows the determined trajectory and monitors a deviation therefrom. In case a deviation is detected, the processing reverts to determining the new own current location and repeats the search for suitable trajectory to the target location.

Probabilistic roadmap planning as discussed by R. Geraerts and M. Overmars in "A Comparative Study of Probabilistic Roadmap Planers", Proceedings of the Workshop on the Algorithmic Foundations of Robotics (WAFR) 2002, is an approach for motion planning with a training phase and a subsequent application phase for solving the actual navigation task. During the training phase, probabilistic roadmap planning provides metric position information of the mobile device. The application phase also requires executing a path planning algorithm and is therefore blocking processing resources. The determined paths from the path planning algorithm are restricted to mapped points in the training phase. An interpolation for path determination between training points from the training phase is not possible.

The prior art solutions further suffer from requiring a globally consistent metric map. Travelling on the determined trajectory can only start when the step of path planning is successfully completed and a determined trajectory is available. However, finding trajectories avoiding obstacles is a complex, time consuming and costly task with regard to processing of an electronic control unit of an autonomously operating vehicle. A metric map has to be made available and stored in a memory of the navigation system of the autonomously operating vehicle. A SLAM approach can solve the localization task and mapping task, but is silent with respect to determining a suitable path, and especially in combination with an added path planning module has high memory and processing requirements.

Thus, the objective technical problem of providing a trajectory planning method requiring less processing power and less memory resources than the prior art is to be solved.

The problem is solved by the navigation method of claim 1 and the navigation system according to the corresponding independent system claim.

The dependent claims define further advantageous embodiments of the invention.

SUMMARY

According to a first aspect, the method for navigating a mobile device with the mobile device comprising at least one sensor, an electronic control unit that can be a microprocessor and an output unit comprises a step of acquiring sensor data from the at least one sensor on an environment of the mobile device. In a step of calculating a gradient of a difference of a target environmental representation and a current environmental representation is calculated. A movement direction to reach a target position corresponding to the target environmental representation is determined based on the estimated gradient is determined. The determined movement direction for navigating the mobile device is then output by the output unit, for example an output interface, to an actor of the mobile device.

Calculating a difference refers to a calculating distance or calculating a distance measure between feature values of the current location of the mobile device and the feature values at the target location. Calculating a distance may for example include calculating a distance such as a Euclidean distance, between feature values of the current environmental representation and of the target environmental representation. In this respect the distance may have the form a multi-dimensional vector. The target environmental representation may be stored in the memory of the mobile device.

The selected path when applying the method may be suboptimal in a mathematical point of view, but it is rapidly selected, flexible and the resulting navigation behavior in form of determined movement direction addressing the navigation task is adaptive. The method may advantageously cover a learning phase, and provides based on the result of the learning phase a navigation for the mobile device in order to reach the target location. This proposed additional navigation is highly efficient without requiring another training phase as it is the case with known reinforcement learning approaches which are commonly used for navigation.

According to a preferred embodiment, the method for navigating a mobile device further comprises a step of generating an environmental representation by performing unsupervised learning from the acquired sensor data.

Unsupervised (machine) learning is the machine learning task of inferring a function to describe hidden structure from unlabeled data. Unlabeled data refers to data in which a classification or a categorization is not included in the observations. Since the data provided to the learner are unlabeled, there is no evaluation of the accuracy of the structure that is output by the relevant algorithm, which distinguishes unsupervised learning from supervised learning or reinforcement learning. Unsupervised learning describes machine learning without known target values and without any reward from the environment. The learning machine attempts to recognize patterns in the data which are different from noise without structure. Generating an environmental representation from acquired sensor data via unsupervised learning provides a set data on the environment which enables the navigation method to directly extract suitable path data using a gradient method and without requiring a separate path planning algorithm for the navigation task at hand.

Preferably, the method for navigating a mobile device according to claim applies a slowness learning rule as the unsupervised learning in the step of generating the environmental representation.

According to an embodiment, the method for navigating a mobile device applies a slow feature analysis as the unsupervised learning in the step of generating the environmental representation.

An environmental representation learned as a slow feature representation encodes spatial attributes of the environment, for example obstacles and different terrain properties, which are reflected in the gradients and enable an efficient navigation based on a suitable evaluation of the environmental representation.

According to an embodiment, the method for navigating a mobile device calculates the gradient by fitting a plane to the environmental representation in the step of calculating the gradient.

The method for navigating a mobile device according to an advantageous embodiment calculates the gradient by fitting a plane to the learned environmental representation through more than three points of the environmental representation in the step of calculating the gradient.

At least three points are necessary for fitting a plane in order to estimate the gradient, but using more points for fitting the plane offers the advantage that an influence of noise can be reduced in the calculation of the gradient.

According to an embodiment the gradient is calculated for multiple dimensions of the environmental representation in the step of calculating the gradient, the gradient is calculated for multiple dimensions of the environmental representation, in particular by using a weighted sum of the multiple dimensions of the environmental representation.

The method for navigating a mobile device according to an embodiment includes in the step of calculating the gradient calculating the gradient for the difference between the current environmental representation and the target environmental representation using a weighted sum of the multiple dimensions of the difference. A measure of slowness can be used for weighting.

According to an embodiment the method for navigating a mobile device further comprises steps of computing a plausibility of the environmental representation and/or of the movement direction of the mobile device by determining a rate of change of the environmental representation and/or the movement direction, and of initiating an action if the rate of change exceeds a predetermined threshold.

The method for navigating a mobile device performs issuing a warning to a user or repeating the steps of acquiring sensor data on an environment of the mobile device and of generating an environmental representation from the acquired sensor data in the step of initiating an action if the rate of change exceeds a predetermined threshold.

Such relearning of the environmental representation is particularly advantageous when the environment of the mobile device changed substantially since last executing a learning phase on the environment. Automatically initiating the learning phase improves a capability of the mobile device to handle changing environments in an autonomous manner.

According to an embodiment, the method for navigating a mobile device further comprises a step of adapting a movement trajectory of the mobile device for optimizing the calculation of the gradient.

Thereby a smooth and resource-preserving calculation (or estimation) of the gradient is achieved.

The method for navigating a mobile device according to an embodiment repeats the steps of calculating a gradient of the difference, of determining a movement direction to reach a target position corresponding to the target representation based on the estimated gradient, and of outputting the determined movement direction, until the distance is below a predetermined threshold. The method for navigating a mobile device changes to a further navigation method when the distance is below the predetermined threshold.

Switching to a further, different navigation method in the vicinity of the target location combines the advantage of efficient navigation using the gradient based approach with the increased precision at increased computational expense of other navigation methods for the final approach. Switching to another navigation method is particularly advantageous near the target location, when the gradient becomes a small value.

The method for navigating a mobile device according to an embodiment modifies in the step of determining a movement direction the movement direction such that the movement direction deviates from a direction of a fastest gradient descent in order to enable a robust determination of the gradient in the next cycles of the inventive method. For example collinear steps may be avoided which would deteriorate a quality of the gradient direction estimation.

According to an embodiment, the method for navigating a mobile device, in the step of determining the movement direction a momentum term is added to the determined movement direction for increasing robustness against local minima and noisy representations of the gradient. The determined new direction is thus a compromise between a steepest descent along the determined gradient and the actual travel direction in a previous cycle of the method in the form of a weighted sum. Alternatively, a simultaneous perturbation stochastic approximation (SPSA) approach could be followed.

The momentum term refers to a simulation of learning algorithms and serves mostly for avoiding local minima and thereby increases speed of learning and avoids local minima during the learning phase. Simultaneous perturbation stochastic approximation (SPSA) is a type of stochastic approximation algorithm and an algorithmic method for optimizing systems with multiple unknown parameters. As an optimization method, it is particularly suited to large-scale population models, adaptive modeling and simulation optimization. SPSA is a descent method capable of finding global minima. Its main feature is the gradient approximation that requires only two measurements of the objective function, regardless of the dimension of the optimization problem. While gradient methods follow approximately the steepest descent direction, SPSA, with a random search direction, does not follow exactly the gradient path. In average though, it tracks nearly the gradient path because the gradient approximation is an almost unbiased estimator of the gradient.

A second aspect of the invention is a computer program with program-code for executing the steps according to the method, when the program is executed on a computer or digital signal processor. The computer program-product with program-code can be stored on a machine-readable medium or a machine-readable data carrier or any other non-transient storage medium.

The second aspect includes a digital storage medium with electronically readable control signals which can interact with a computer or digital signal processor in that way that the navigation method according to an embodiment is executed.

A third aspect of the invention concerns a system for navigating a mobile device, the mobile device comprising an electronic control unit connected with a memory and an output unit (output interface), further comprising an acquisition unit (acquisition interface or sensor interface) for acquiring sensor data on an environment of the mobile device from at least one sensor, and the electronic control unit is configured to calculate a gradient of a difference of a target environmental representation and a current environmental representation and to determine a movement direction to reach a target position corresponding to the target environmental representation based on the calculated gradient. The output unit is configured to output the determined movement direction for navigating the mobile device.

The mobile device can be a smartphone or a vehicle. Most advantageously the mobile device is an autonomously operating vehicle, or a robot, in particular a cleaning robot or an autonomous lawn mower.

In cleaning robots or autonomous lawn mowers a random driving work mode is often implemented and can advantageously be used for the learning phase (training phase) for learning the environmental representations of various locations before switching to a more efficient behavior based on the inventive navigation system. Nevertheless the versatility and efficiency of the inventive method also enables its use on a smartphone for guiding a user of the smartphone in the environment.

The system for navigating a mobile device according to an embodiment comprises plural sensors of a same sensor type arranged at spatially different sensor positions, wherein the sensor positions of the plural sensors are known relative to each other, and the electronic control unit calculates (estimates) the gradient by fitting a plane to the difference between current environmental representation and target environmental representation.

By a mobile device with a sensor configuration of plural sensors, a plurality of measurement points can be acquired simultaneously without the mobile device moving between acquiring the measurement points. Thus, the determination of the gradient is improved.

The system for navigating a mobile device may include the electronic control unit configured to calculate the gradient further taking sensor data from past sensor readings into account.

A variety of sensor types can be used for capturing the sensor data for the navigation system, however cameras are a preferred sensor type due to generating sensor data with large and rich information content about the environment.

BRIEF DESCRIPTION OF THE DRAWINGS

An embodiment of the navigation method and the navigation system is discussed in detail using the figures, in which FIG. 1 denotes a flowchart of a navigation method for a mobile device according to an embodiment, FIG. 2 denotes a general block diagram of main elements of the navigation system.

DETAILED DESCRIPTION

Navigation is a field of study that focuses on the process of monitoring a current position and controlling the movement of a vehicle from one place to another. The field of navigation may include general categories of land navigation, marine navigation, aeronautic navigation, and space navigation. Navigational techniques involve locating the navigator's current location (current position) compared to known locations or patterns. Navigation also may refer to any skill involving the determination of a position and a direction. Navigation may therefore include orienteering and pedestrian navigation in addition to vehicle navigation, too.

Figure 1:
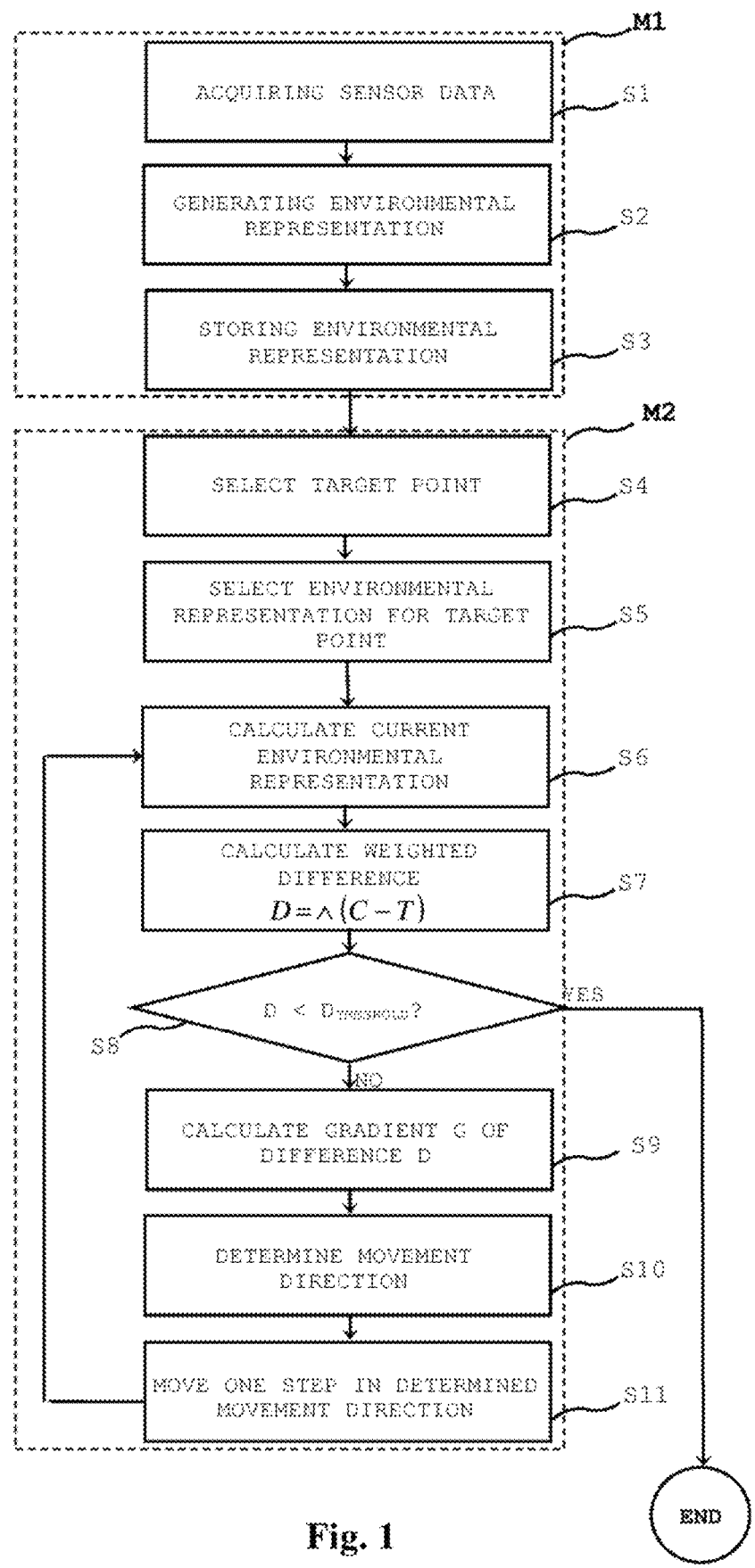
Figure 2:
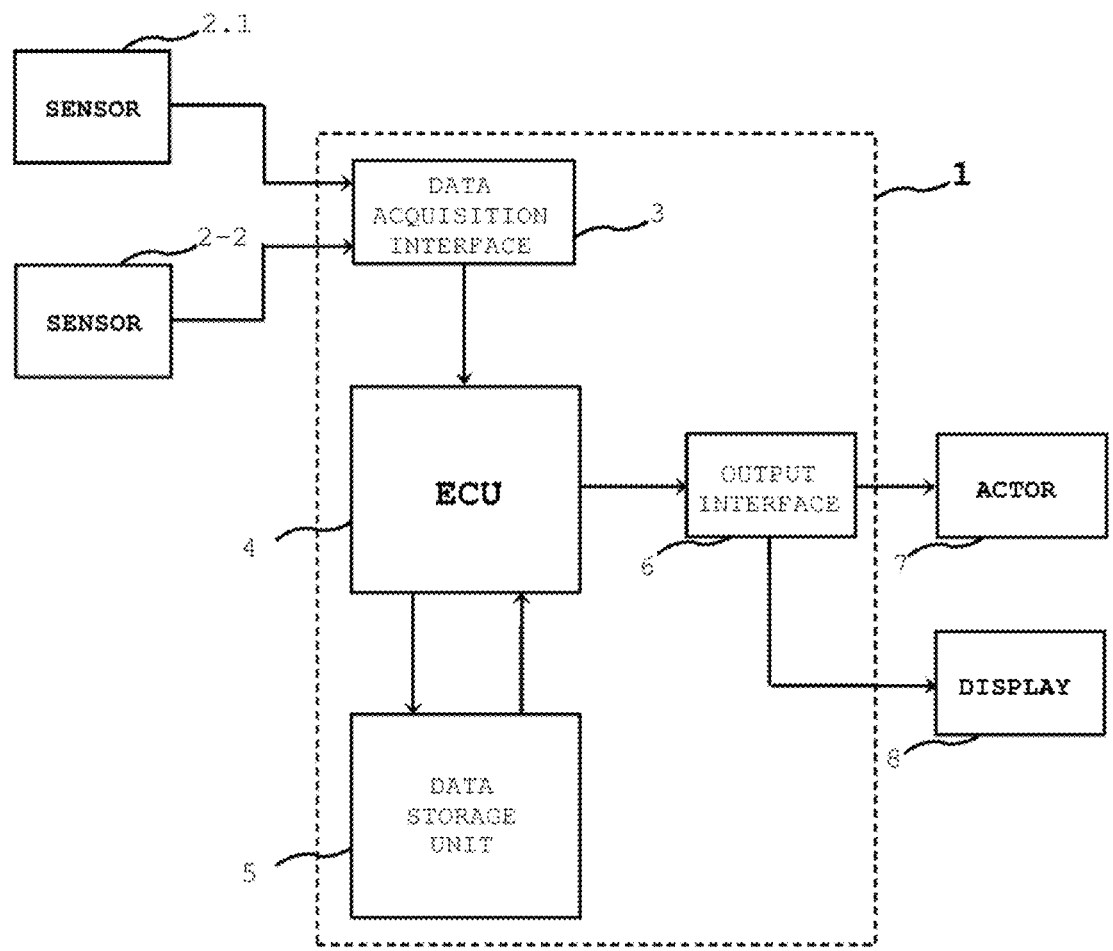

A flowchart of a navigation method for a mobile device according to an embodiment is shown in FIG. 1. While discussing the individual method steps and their sequence, reference is made to an embodiment of the navigation system 1 depicted in FIG. 2 in a schematic block diagram.

The navigation method comprises two distinct phases: In a (first) learning (training) phase M1 an environmental representation is learned. In a (second) application phase M2, a navigation task is performed based on the learned environmental representation. A navigation task can include navigating the mobile device from a starting point to a target point in a working environment.

The individual method steps can be implemented in software modules running in the electronic control unit 4 of the navigation system 1. The electronic control unit 4 may be a processor, a plurality of processors or signal processors arranged on a common board or in a distributed manner on the mobile device. Part or all of the software may be running locally in the mobile device and/or externally to the mobile device on remote computer.

The learning phase M1 starts with a step S1 of a data acquisition unit 3 (data acquisition interface) acquiring sensor data from at least one sensor 2.1, 2.2. The acquired sensor data includes information acquired by one or more sensors 2.1, 2.2 on the environment of the mobile vehicle. The mobile vehicle can be assigned a working space or working area in which the mobile vehicle is currently located at a current location (current position). The information contained in the acquired sensor data describes how the sensor 2.1, 2.2 of the vehicle perceives the perceivable environment from the current location of the mobile device.

Acquired sensor data typically varies strongly while the mobile device travels along a trajectory. Furthermore sensory representations in sensor data of adjacent positions are often more different than sensory representations of widely separated places. Even rotating the mobile device on a spot can change the sensory representation completely. Taking a difference between the current position's sensory representation and a target positions representation will thus typically vary wildly and includes little or no information where to go next for arriving at the target position.

The sensor type or sensor combination may include cameras, sonar, radar laser scanner, global navigation satellite systems (GNSS), radio frequency identification (RFID) detection and ranging, Cameras sensors with a 360 degree field of view, for example fisheye camera or catadioptric camera, enable a simulated rotation of the mobile device and its sensor 2.1, 2.2. A catadioptric sensor is a visual sensor that contains mirrors (catoptrics) and lenses (dioptrics) as a combined catadioptric system. The catadioptric sensor is a panoramic sensor created by pointing a camera at a curved mirror. Generally, for a good sensor performance due to advantageous sensor data, the sensors 2.1, 2.2 or sensor arrangement should yield unique representations of any place in the environment during the learning phase M1.

In step S2, the acquired sensor data is used to generate an environmental representation based on the acquired sensor data. In particular, in step S2 an environmental representation by performing unsupervised learning from the acquired sensor data is performed. In a particularly preferred embodiment, a slow feature analysis (SFA) is performed to generate the environmental representation.

In slowness learning as executed by SFA, the resulting environmental representation mainly depends on the movement statistics of the mobile device during the learning phase M1. Position encoding with invariance to a direction of a sensor 2.1, 2.2, in particular a camera sensor, requires a rather large amount of sensor rotation around the yaw-axis of the sensor 2.1, 2.2 when compared to translational movement of the sensor 2.1, 2.2 during mapping of the environment of the mobile device. For a sensor 2.1, 2.2 mounted in a fixed manner to the mobile device and with an invariable sensor coverage area, the sensor movement corresponds to a movement of the mobile device.

The environmental representation generated in step S2 is stored in a data storage unit (memory) 5. The mobile device may comprise a navigation system 1 with an on board data storage unit 5 (memory) storing the learned environmental representation. Additionally or alternatively, the navigation system has access, for example via a communication unit not shown in FIG. 2 to a data server located externally to the mobile device and storing the environmental representation, or a plurality of environmental representations for example for plural working areas.

Certain unsupervised learning algorithms based on slowness learning generate spatial representations or maps that vary smoothly in space. The invention benefits from such smooth representations, which are learned by unsupervised learning for a specific environment in the learning phase M1, for example by the mobile device driving around randomly.

Training trajectories in the training phase M1 are particularly advantageous, when orientation invariance is achieved with a relatively high amount of turning compared to movement forward of the mobile device during the learning phase M1, or by simulating such rotations by additionally rotating the sensory representation during the learning phase M1.

Preferably a sufficiently long intermeshed and homogenous coverage of the training area is provided during the learning phase M1.

If the average movement velocity per region of the training area is non-homogenous, for example caused by velocity differences when travelling on a road surface versus travelling through mud, the travel velocity of the mobile device will be encoded in the resulting environmental representations from the training phase M1.

For a large class of suitable training trajectories, after the learning phase M1, a subset of the learned representations are invariant with respect to orientation and change monotonically over space. These properties allow to navigate a mobile device between points by gradient descent on the difference of environmental representations between a spatial representation corresponding to a current location of the mobile device and a target spatial representation corresponding to a target location of the navigation task at hand.

The application phase M2 for performing a navigation task of the mobile device includes the mobile device being located at a start location, or current location, in the working area. In a step S4, a target location in the working area is selected. The mobile device is intended to proceed (drive) autonomously to the target point in order to perform the navigation task.

In step S4, a target location is selected, for example in metric (x;y)-coordinates at a target location $(x_0; y_0)$. The target location $(x_0; y_0)$ is then specified in the slow feature space, for example in the slow feature values of the environmental representation at the target location $(x_0; y_0)$. Specifying the slow feature values at the target location can be performed by selecting the values of the environmental representation at the target location $(x_0; y_0)$ as stored in step S3 of the training phase M1 in the data storage unit 5 of the navigation system 1.

In step S5, a target environmental representation T for the selected target location is determined by the electronic control unit 4 accessing the data storage unit 5.

In step S6, the current environmental representation C for the starting point, which corresponds to a current location of the mobile device, is calculated by the electronic control unit 4.

In step S6, the electronic control unit 4 may further determine a plausibility of the calculated current environmental representation. The plausibility may be determined based on a rate of change, in particular based on a rate of change of the current environmental representation to the environmental representation of a previous processing cycle.

If the rate of change exceeds a predetermined threshold rate, the electronic control unit 4 may determine and initiate an action. The action may include issuing a warning to a user or driver.

Additionally or alternatively, if the rate of change exceeds a predetermined threshold rate, step S1 of acquiring sensor data on an environment of the mobile device and step S2 of generating an environmental representation from the acquired sensor data may be repeated in the action.

In step S7 a weighted difference D is calculated based on the current environmental representation C $$D := \|WV^t\|; \qquad (1)$$

D is a scalar value obtained by the norm of the product of $V^t$ which is the transposed difference vector V with a weighting vector W:

$$W = [w_1, w_2, \ldots, w_n] \qquad (2)$$

$$V = C - T = [c_1 - t_1, c_2 - t_2, \ldots, c_n - t_n] \qquad (3)$$

with the slow feature vector C of the current location and the slow feature vector T of the target location.

Step S7 comprises calculating a difference which in the embodiment refers to a calculating distance measure D between weighted slow feature values of the current location of the mobile device and the slow feature values at the target location. Calculating a distance may for example include calculating a Euclidean distance. Calculating a distance can be calculating a sum of squared differences between the slow feature values of the current location and the slow feature values of the target location.

The calculated weighted difference D is then compared to a first threshold $D_{THRESHOLD}$ in step S8. If the calculated weighted difference D is smaller than the first threshold $D_{THRESHOLD}$ $$D < D_{TRESHOLD}; \qquad (4)$$

then execution of the navigation method may terminate, as the mobile device is already within a predetermined distance from the target location. If the answer to equation (4) is NO as the calculated difference D is equal to or even exceeds the first threshold $D_{TRESHOLD}$, the navigation method proceeds to step S9.

In step S9 succeeding to step S8, a gradient G of the difference D of the target environmental representation determined in step S5 and the current environmental representation determined in step S6 is calculated.

In step S9 of calculating the gradient G, the electronic control unit 4 may use a momentum term or a simultaneous perturbation stochastic approximation (SPSA) approach for estimating the gradient G.

Step S9 of calculating a gradient G for navigating in an SFA space can be performed by first calculating weighted slow feature values for at least three nearby positions $(x_i, y_i)$, i=1, 2, 3. Then a local linear approximation of an error surface by fitting a plane to the three nearby positions $(x_i, y_i)$ is calculated. A slope of the plane with respect to the distance D provides the gradient G.

The electronic control unit 4 may calculate the gradient G by fitting a plane to the difference. The electronic control unit 4 may calculate the gradient G in step S9 for multiple dimensions of the difference D, in particular by using a weighted sum of the multiple dimensions of the difference.

The electronic control unit 4 may calculate the gradient by using a weighted sum of the multiple dimensions of the difference D, wherein a measure of slowness is used for weighting.

In step S10 succeeding to step S9, a movement direction for the mobile device to reach the target position is determined based on the calculated gradient G from step S9.

The method for navigating a mobile device may further comprise a step of adapting a determined moving direction of the mobile device such that a movement trajectory of the mobile device is optimized for calculating the gradient G in a next calculation cycle of the application phase M2.

In step S11, the output unit 6 (output interface) outputs the determined movement direction for navigating the mobile device to an actor 7 of the mobile device. The actor 7 may be a directional drive control of the mobile device and controls a vehicle steering angle and a vehicle movement velocity based on the determined movement direction.

Additionally or alternatively, the output unit 6 outputs the determined movement direction to a display 8. For example the display 8 is a display of a computer, a handheld computer or smartphone running the navigation method as an application program and the determined movement direction is displayed as a recommendation to a user for moving towards the target location. The display may be a display mounted in a vehicle and the determined movement direction is displayed thereon as a recommendation to a driver for driving to the target location.

Additionally or alternatively, the electronic control unit 4 may determine a plausibility based on an estimated path or the movement direction of the mobile device by determining a rate of change of the environmental representation between a current location and a previous location of the mobile device and/or the estimated path or the movement direction in step S11. If the rate of change exceeds a predetermined threshold rate, in particular if a rate of change of the determined movement direction to a movement direction of a previous processing cycle exceeds the predetermined threshold rate, the electronic control unit 4 may determine and initiate a suitable action.

The suitable action may include issuing a warning to a user or driver. Additionally or alternatively, the step S1 of acquiring sensor data on an environment of the mobile device and step S2 of generating an environmental representation from the acquired sensor data may be repeated.

The rate of change may additionally or alternatively be determined based on the calculated difference D of the actual processing cycle and a difference D of the previous processing cycle.

The navigation method repeats the steps of calculating a gradient G of the difference D (S9), of determining a movement direction to reach the target position corresponding to the target representation based on the calculated gradient G (S10), and of outputting the determined movement direction (S11), until the calculated distance D is smaller than the threshold distance $D_{TRESHOLD}$.

The navigation method may change to a further navigation method when the electronic control unit determines the distance D to be smaller than the threshold $D_{TRESHOLD}$. The further navigation method can be selected for more precise navigation results at the expense of increased processing requirements in order ensure that the mobile device exactly arrives at the target position, whereas most of the navigation task at hand is solved based on the inventive navigation method at comparatively advantageous processing requirements.

In order to a acquire cost measurement functions from at least three nearby locations to the current location an embodiment experimentally arranged one omnidirectional camera on each of two sides of the mobile device with a fixed offset to a coordinate system of the mobile device. Thus, two measurements (measurement points) are obtained for each time step. In order to estimate a gradient for a time $t_1$, a difference quotient from cost values calculated for the sensor data (image) from the left and right camera sensor and the corresponding translation vector is used. Then, along the estimated gradient, two additional cost values at the time $t_1$ are measured. Subsequently the plane defined by the four points from times $t_0$ and time $t_1$ is calculated. This may be done by using three of the four locations to compute the plane normal vector using a cross product. This step of computing the plane normal vector can be repeated for all four possible combinations of locations and a mean of the computed normal vectors obtained in the repetitions may be used to approximate the gradient by the slope of the corresponding plane.

In order to use sensor data from past locations in time, a metric estimate of the position of those past locations relative to a current location is required. This metric estimate of the location may be acquired using a local displacement estimation. Such local displacement estimation may be obtained via an odometer or an inertial measurement unit (IMU) of the mobile device.

Subsequently the mobile device moves one step along the gradient direction to a new current location and replaces the locations of $t_0$ with those locations of $t_1$. Further, the cost values measured at location $t_0$ are replaced by values measured at the new current location. This process can be repeated until a predefined precision is achieved or a maximum number of iterations is reached.

The estimated gradient can be multiplied with a learning rate η.

Additionally or alternatively, a momentum term γ can be used to incorporate information from past gradient information to improve convergence of the processing. This also aids in overcoming local minima of the cost function.

In particular, as the slow feature (SFA) environmental representations are invariant with respect to the orientation and only code for the location, the SFA representations change monotonically with location. Given two locations in 2-dimensional (2D) space, a difference between the corresponding slow feature representations of the two locations is used to define a cost function and to estimate a navigation direction by determining a gradient of a cost surface described by the cost function. The gradient may be advantageously approximated or calculated. The mobile device can navigate between the current location and the target location by calculating a movement direction based on the determined gradient, in particular by performing a gradient descent on the cost surface.

The environmental representations representing the sensor data at the possible target locations in the working area can be acquired in the training phase M1 at points of interest, for example at a charging station of the mobile device.

If, for example, a number of n slow feature components are chosen to be used for representing the environment. A current position in a 2D space is given by $$p:=(x_p, y_p); \quad (5)$$

y spatial coordinates $x_p$ and $y_p$. The mapping function f $$f: R^2 \rightarrow R^n \quad (6)$$

transforms a position into the slow feature space by processing the corresponding sensor data. Given a target location g $$g:=(x_g, y_g); \quad (7)$$

a cost function C $$C: R^n \rightarrow R \quad (8)$$

can be defined which computes cost from the current location to the target location for the mobile device with f(p) as single input. C may be any distance function, for example a Euclidian distance function $$C(f(p)) = \sqrt{\Sigma_{i=1}^{n}(f(p_i) - f(g_i))^2} \quad (9)$$

Ideally, an analytic gradient $$\frac{\partial C(f(p))}{\partial p} \quad (10)$$

of the distance function is determined in order to determine the movement direction. More feasible is to determine a local approximation of the gradient, for example by computing a local linear approximation.

In order to compute a linear approximation for example, in addition of the cost C(f(p)) of the current location at least two additional cost values $C(f(p_1))$, $C(f(p_2))$ for locations nearby are acquired. The additional locations are to be arranged non-collinear in the space. The at least two additional locations can be used to fit a plane to the surface of the cost function C in the current location.

The navigation method and corresponding navigation system of the embodiment operate in the SFA space and use the gradient approximated from distance measurements in the SFA space between a current value and a target value. The learned slow feature representation encodes other spatial attributes of the environment, for example obstacles and different terrain properties, which are reflected in the calculated gradients and leads to an efficient navigation for a mobile device in the environment.

Step S2 during the learning phase M1 of generating an environmental representation is discussed with reference to FIG. 3 in more detail.

The electronic control unit 4 can, without being limited to the discussed approach, apply a slow feature analysis (SFA) approach to transform the sensor data, in particular multi-dimensional sensor data to slowly varying output signals encoding spatial properties of the environment into a slowly varying environmental representation.

The SFA approach aims at finding instantaneous scalar input-output functions $g_j$ (x), such that output signals $y_j$ (t)

$$y_j(t) := g_j(x(t)); \quad (11)$$

minimize $$\Delta y_j(t) := \langle \dot{y}_j \rangle_t; \quad (12)$$

under constraints of $$\langle y_j \rangle_t := 0; \quad (13)$$

which means that a mean value of the output signals $y_j$ (t) is zero, and $$\langle y_j^2 \rangle_t := 1; \quad (14)$$

which means, that the output signals $y_j$ (t) have a unit variance, and further, that $$\forall i < j: = \langle y_i y_j \rangle_t = 0; \quad (15)$$

which requires that output functions $y_j$ (t) are decorrelated from one other and guarantees that different output signal components code different information. In equations (13), (14) and (15), the term $\langle \rangle$ denotes an averaging over time and y' is the first derivative of y with respect to time. The Δ-value in (4) is the optimization objective and measures a slowness of an output signal as the time average of its squared derivative. A low Δ-value indicates small variations over time and accordingly slowly varying signals. Equations (13) and (14) normalize all output signals to a common scale. Their temporal derivative is therefore directly comparable. The formulation of (13) and (14) suppresses the trivial constant solution to the optimization problem, which carries no information, despite being infinitely slow. Although aiming at maximizing slowness over time, the functions $g_j$ must extract the output signals instantaneously. Solutions which produce slow-varying output signals by smoothing input sensor signals over time, for example by computing a moving average of $x_i$ (t), or by low pass-filtering the signals are thus excluded. The SFA offers instantaneous processing and simultaneously a slow moving output carrying the information, in particular that different functions $g_j$ encode different aspects of the input sensor signals acquired by the sensors 2.1, 2.2 on the environment of the mobile device.

The algorithm for SFA is generally known and for example published by Laurenz Wiskott and Terrence J. Sejnowski as "Slow feature analysis: Unsupervised Learning of invariances" in Neural Computation, vol. 14, vol. 4, pp 715 to 770, 2002, which is incorporated by reference for the embodiment using unsupervised learning using the SFA algorithm.

The SFA analysis may include finding a solution based on solving an eigenvalue problem.

For addressing the task of self-localization functions that encode the mobile devices current location as slowly varying features and are simultaneously invariant with respect to the mobile devices actual orientation are suited. The information encoded in the learned slow features depends on the statistics of the training data, in particular the sensor data acquired during the training phase M1. In order to achieve orientation invariance, the orientation of the mobile device has to be changed on a faster timescale than the positon of the mobile device during the training Phase M1.

The mobile device can for example use an omnidirectional mirror suitably arranged with respect to the sensor 2.1, 2.2 implemented as a camera in order to realize additional mobile device rotation and shift a sliding window over the periodic panoramic window for preprocessing the acquired sensor data.

The navigation method acquires in step S1 sensor data, in particular visual sensor data, which can be processed in step S2 by a hierarchical network made of several converging layers. The layers can be trained subsequently with all training visual sensor data images in temporal order of their recording during the training phase M1. A single node per layer is trained with stimuli from all node locations in its layer and replicated throughout the layer after training. Once the training phase is finished, slow features are computed instantaneously from a single image.

Figure 3:
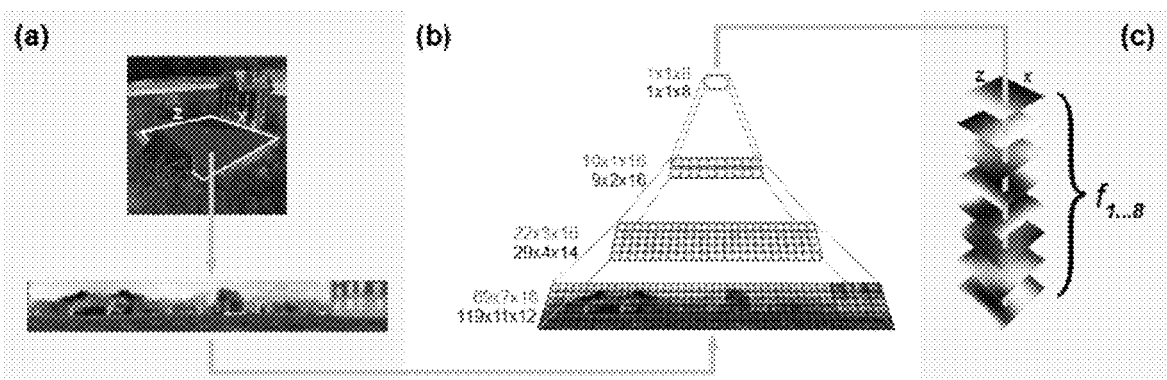
FIG. 3 shows a schematic model architecture for an SFA based analysis of an environment.

FIG. 3 provides a general model architecture in its mid portion. FIG. 3 and the general steps for generating the environmental representation may be found in more detail in "Outdoor self-localisation of a mobile robot using slow-feature analysis" by B. Metka, M. Franzius and U. Bauer-Wersing, in Neural Information processing, $20^{th}$ International conference ICONIP 2013, Daegu, Korea, Nov. 3-7, 2013, Proceedings, Part I, 2013, pp 403-408, which is incorporated by reference for the details of the learning phase M1 of the navigation method.

The left portion of FIG. 3 shows the visual data which is steadily captured from a current position of the mobile device carrying a camera sensor 2.1, 2.2 and transformed into a panoramic view as sensor data.

The mid portion of FIG. 3 shows processing of the panoramic view in step S2 by the network. Each layer of the network comprises overlapping SFA-nodes arranged in a regular grid. Each node performs linear SFA for dimensionality reduction followed by quadratic SFA for slow feature extraction. The output layer is a signal node, whose eight slowest outputs $y_i$ (t) are the orientation invariant encoding of the location.

The right portion of FIG. 3 depicts the color-coded SFA-outputs $F_{1 \ldots 8}$ over all positions, so-called spatial firing maps, which ideally show characteristic gradients along the coordinate axes and looking identical independent of the specific orientation.

The learned spatial representations are analyzed qualitatively by plotting the color coded slowest outputs over all positions. In case of a strong spatial coding, a clear gradient along the coordinate axis becomes visible in the spatial firing maps of the first two units. Maps of higher units show a mixture of the first two units or higher modes.

Due to the slowness objective of the SFA learning algorithm, obstacles situated in the working area of the mobile device are advantageously encoded in the resulting environmental representations. As during the learning phase, the mobile device, for example a wheeled robot, will not drive along a path crossing the obstacle, sensor data referenced to positions on both sides of the obstacle are separated in time. Slow feature based environmental representations will accordingly flow around the obstacle.

The environmental representation generated in step S2 forms the basis for the application phase M2 for performing a navigation task. The environment representation is without loss of generality a SFA space as generated in a previous training phase M1. The application phase M2 uses a gradient based evaluation of the SFA space for navigation. Initially a number of slow feature components is selected. The slow features may be weighted, for example by multiplying them with the inverse of their β-value, for example a measure for their temporal variation.

Generally, the invention is in the field of mobile systems and in assistance in operating mobile systems or autonomously operating mobile systems. A mobility system can be a vehicle, in particular a car or a motor cycle. The mobility system can also be a watercraft (vessel), an air vehicle or a space vehicle. The vehicle may be controlled by a user (person) on board of the vehicle or may be remotely controlled from a remote control position (facility), or preferably operating autonomously. The vehicle may be partially or fully autonomously operating as a robot. Respectively, the user (operator) of the vehicle and the assistance method can be a driver (vehicle driver), a rider in case of a motorcycle or a pilot of the vehicle. The user can also be a co-driver, co-pilot or navigator, which typically performs one or more subtasks of operating the vehicle and assists a pilot or driver. Furthermore, in case of a remotely controlled vehicle, the user may be an operator of a remotely piloted vehicle who performs vehicle control from a position detached from the vehicle.

Operating a vehicle is to be understood in present application as driving (piloting) vehicle or performing at least one of the tasks such as steering, accelerating or decelerating (braking), navigating or supervising the operation of the vehicle.

The invention claimed is:

1. A method for navigating a mobile device, the mobile device comprising at least one sensor, an electronic control unit and an output unit, the method comprising:

acquiring sensor data from the at least one sensor on an environment of the mobile device;

generating environmental representations, in a training phase, from the acquired sensor data;

calculating, in a navigation phase, a gradient of a difference of a target environmental representation and a current environmental representation, wherein the target environmental representation corresponds to a target location, and the current environmental representation corresponds to a current location of the mobile device, and are selected from the environmental representations generated in the training phase;

determining a movement direction for the mobile device to reach the target location corresponding to the target environmental representation based on the gradient; and outputting the movement direction for navigating the mobile device.

2. The method for navigating a mobile device according to claim 1, further comprising:

generating the environmental representations by performing unsupervised learning from the acquired sensor data.

3. The method for navigating a mobile device according to claim 2, wherein in the generating the environmental representations, a slowness learning rule is applied as the unsupervised learning.

4. The method for navigating a mobile device according to claim 2, wherein
in the generating the environmental representations, a slow feature analysis is applied as the unsupervised learning.

5. The method for navigating a mobile device according to claim 1, wherein
in the calculating the gradient, the gradient is calculated by fitting a plane to the difference.

6. The method for navigating a mobile device according to claim 5, wherein
in the calculating the gradient, the gradient is calculated by fitting a plane through more than three points of the difference.

7. The method for navigating a mobile device according to claim 1, wherein
in the calculating the gradient, the gradient is calculated for multiple dimensions of the difference, in particular by using a weighted sum of the multiple dimensions of the difference.

8. The method for navigating a mobile device according to claim 1, wherein
in the calculating the gradient, the gradient is calculated for multiple dimensions of the difference by using a weighted sum of the multiple dimensions of the difference, wherein a measure of slowness is used for weighting.

9. The method for navigating a mobile device according to claim 1, further comprising:
computing a plausibility of the environmental representations or of an estimated path of the mobile device by determining a rate of change of the environmental representations or the estimated path, and
initiating an action if the rate of change exceeds a predetermined threshold.

10. A computer program embodied on a non-transitory computer-readable medium, said computer-readable medium containing program-code which, when executed on a computer or digital signal processor, control the computer or digital signal processor to perform the method of claim 1.

11. The method for navigating a mobile device according to claim 1, wherein
in the outputting of the movement direction, an action is initiated if a rate of change exceeds a predetermined threshold, the action comprising at least one of issuing a warning to a user, repeating the steps of acquiring sensor data on an environment of the mobile device and generating an environmental representation from the acquired sensor data.

12. The method for navigating a mobile device according to claim 1, further comprising:
configuring a movement trajectory of the mobile device for optimizing the calculating the gradient.

13. The method for navigating a mobile device according to claim 1, further comprising:
repeating the calculating the gradient, determining the movement direction to reach the target position corresponding to the target environmental representation based on the gradient, and outputting the movement direction, until the difference is below a predetermined threshold, and
changing to a further navigation method when the difference is below the predetermined threshold.

14. A system for navigating a mobile device, the system comprising:
an electronic control unit connected with a memory and an output unit, and
an acquisition unit for acquiring sensor data on an environment of the mobile device from at least one sensor,
wherein the electronic control unit is configured to
generate, in a training phase, environmental representations from the acquired sensor data,
calculate, in a navigation phase, a gradient of a difference of a target environmental representation and a current environmental representation,
wherein the target environmental representation corresponds to a target location, and the current environmental representation corresponds to a current location of the mobile device, and are selected from the environmental representations generated in the training phase,
determine a movement direction for the mobile device to reach the target location corresponding to the target environmental representation based on the gradient, and
the output unit is configured to output the determined movement direction for navigating the mobile device.

15. The system for navigating a mobile device according to claim 14, wherein
the mobile device comprises a smartphone or a vehicle, in particular an autonomously operating vehicle, or a robot, in particular a cleaning robot or an autonomous lawn mower.

16. The system for navigating a mobile device according to claim 14, wherein
the system comprises plural sensors of a same sensor type arranged at spatially different sensor positions,
wherein the sensor positions of the plural sensors are known relative to each other, and
wherein the electronic control unit is configured to calculate the gradient by fitting a plane to the difference.

17. The system for navigating a mobile device according to claim 14, wherein
the electronic control unit is configured to calculate the gradient further taking sensor data from past sensor readings into account.

18. A method for navigating a mobile device, the mobile device comprising at least one sensor, an electronic control unit and an output unit, the method comprising:
acquiring sensor data from the at least one sensor on an environment of the mobile device,
calculating a gradient of a difference of a target environmental representation and a current environmental representation,
determining a movement direction to reach a target position corresponding to the target environmental representation based on the gradient,
wherein the movement direction is modified to deviate from a direction of a fastest gradient descent, in particular to avoid collinear steps in a next method cycle, and
outputting the determined movement direction for navigating the mobile device.

19. The method for navigating a mobile device according to claim 18, wherein
in the determining a movement direction, a momentum term is added or a simultaneous perturbation stochastic approximation approach is used.

20. A system for navigating a mobile device, the system comprising:

an electronic control unit connected with a memory and an output unit, and an acquisition unit for acquiring sensor data on an environment of the mobile device from at least one sensor, wherein the electronic control unit is configured to calculate a gradient of a difference of a target environmental representation and a current environmental representation, determine a movement direction to reach a target position corresponding to the target environmental representation based on the gradient, wherein the movement direction is modified to deviate from a direction of a fastest gradient descent, in particular to avoid collinear steps in a next method cycle, and wherein the output unit is configured to output the determined movement direction for navigating the mobile device.

* * * * *